(12) United States Patent
Kamalakar

(10) Patent No.: US 12,454,197 B2
(45) Date of Patent: Oct. 28, 2025

(54) METHODS, SYSTEMS, APPARATUSES, AND DEVICES FOR ELECTRICALLY POWERING A VEHICLE

(71) Applicant: Mayur Kamalakar, Tyngsboro, MA (US)

(72) Inventor: Mayur Kamalakar, Tyngsboro, MA (US)

( * ) Notice: Subject to any disclaimer, the term of this patent is extended or adjusted under 35 U.S.C. 154(b) by 0 days.

(21) Appl. No.: 18/890,779

(22) Filed: Sep. 20, 2024

(65) Prior Publication Data
US 2025/0010759 A1    Jan. 9, 2025

(51) Int. Cl.
*H02J 7/02* (2016.01)
*B60L 1/00* (2006.01)
*B60L 50/60* (2019.01)
*B60L 53/10* (2019.01)
*B60L 53/16* (2019.01)
*B60L 53/22* (2019.01)
(Continued)

(52) U.S. Cl.
CPC .............. *B60L 58/12* (2019.02); *B60L 1/006* (2013.01); *B60L 50/60* (2019.02); *B60L 53/11* (2019.02); *B60L 53/16* (2019.02); *B60L 53/22* (2019.02); *B60L 53/62* (2019.02); *B60L 53/80* (2019.02); *H02J 7/02* (2013.01); *B60L 53/51* (2019.02); *B60L 2210/10* (2013.01); *B60L 2210/30* (2013.01)

(58) Field of Classification Search
CPC .......... B60L 58/12; B60L 1/006; B60L 50/60; B60L 53/11; B60L 53/16; B60L 53/22; B60L 53/62; B60L 53/80; B60L 53/51; B60L 2210/10; B60L 2210/30; B60L 53/14; H02J 7/02; Y02T 10/70; Y02T 10/7072; Y02T 90/14
USPC .............. 320/101, 118, 135, 162, 166, 167; 307/48, 66; 318/375, 376, 39, 400.19, 318/400.22
See application file for complete search history.

(56) References Cited

U.S. PATENT DOCUMENTS

2008/0136257 A1\* 6/2008 Flanigan ................. H02P 9/307
 307/10.1
2009/0212626 A1\* 8/2009 Snyder .................. B60L 15/209
 903/930
(Continued)

*Primary Examiner* — Elim Ortiz
(74) *Attorney, Agent, or Firm* — Dhiraj Jindal; PATENT YOGI LLC

(57) ABSTRACT

An apparatus for electrically powering a vehicle includes an energy storage device and a power management unit. The energy storage device is configured for storing electrical energy. The power management unit is electrically coupled with the energy storage device, and configured to be electrically coupled with an electrical propulsion assembly of the vehicle using an output connector assembly comprising a first output connector. The first output connector is configured to be electrically coupled with a propulsion assembly power receiving port of the electrical propulsion assembly. The power management unit is configured for receiving an input electrical power comprising a direct current power from the energy storage device based on the electrical energy stored in the energy storage device and supplying an output electrical power to the electrical propulsion assembly based on the receiving. The supplying of the output electrical power powers the electrical propulsion assembly for propelling the vehicle.

20 Claims, 17 Drawing Sheets

(51) Int. Cl.
  *B60L 53/51*   (2019.01)
  *B60L 53/62*   (2019.01)
  *B60L 53/80*   (2019.01)
  *B60L 58/12*   (2019.01)

(56) References Cited

U.S. PATENT DOCUMENTS

2022/0363160 A1\* 11/2022 Okazaki ................. B60L 58/20
2023/0122499 A1\*  4/2023 Holeton ................. B60L 58/20
                                                            320/109

\* cited by examiner

METHODS, SYSTEMS, APPARATUSES, AND DEVICES FOR ELECTRICALLY POWERING A VEHICLE

FIELD OF THE INVENTION

Generally, the present disclosure relates to the field of electricity. More specifically, the present disclosure relates to methods, systems, apparatuses, and devices for electrically powering a vehicle.

BACKGROUND OF THE INVENTION

Existing techniques for electrically powering a vehicle are deficient with regard to several aspects. For instance, current technologies for charging the battery of vehicles require a high-voltage power supply. As a result, different technologies are needed for charging the battery of the vehicle with a low-voltage power supply. Furthermore, current technologies for charging the battery of the vehicle for electrically powering the vehicle require the vehicle to be stationary. As a result, different technologies are needed that do not require the vehicle to be stationary for the charging of the battery.

Therefore, there is a need for improved methods, systems, apparatuses, and devices for electrically powering a vehicle that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is an apparatus for electrically powering a vehicle, in accordance with some embodiments. Accordingly, the apparatus may include at least one energy storage device and a power management unit. Further, the at least one energy storage device may be configured for storing electrical energy. Further, the power management unit may be electrically coupled with the at least one energy storage device. Further, the power management unit may be configured to be electrically coupled with at least one electrical propulsion assembly of the vehicle using an output connector assembly. Further, the output connector assembly may include at least one first output connector. Further, the at least one first output connector may be configured to be electrically coupled with at least one propulsion assembly power receiving port of the at least one electrical propulsion assembly. Further, the electrically coupling of the power management unit with the at least one electrical propulsion assembly may be based on the electrically coupling of the at least one first output connector with the at least one propulsion assembly power receiving port. Further, the power management unit may be configured for receiving an input electrical power from the at least one energy storage device based on the electrical energy stored in the at least one energy storage device. Further, the input electrical power may be a direct current power. Further, the power management unit may be configured for supplying an output electrical power to the at least one electrical propulsion assembly based on the receiving of the input electrical power. Further, the supplying of the output electrical power powers the at least one electrical propulsion assembly for propelling the vehicle.

Further disclosed herein is an apparatus for electrically powering a vehicle, in accordance with some embodiments. Accordingly, the apparatus may include at least one energy storage device and a power management unit. Further, the at least one energy storage device may be configured for storing electrical energy. Further, the power management unit may be electrically coupled with the at least one energy storage device. Further, the power management unit may be configured to be electrically coupled with at least one electrical propulsion assembly of the vehicle using an output connector assembly. Further, the output connector assembly may include at least one first output connector. Further, the at least one first output connector may be configured to be electrically coupled with at least one propulsion assembly power receiving port of the at least one electrical propulsion assembly. Further, the electrically coupling of the power management unit with the at least one electrical propulsion assembly may be based on the electrically coupling of the at least one first output connector with the at least one propulsion assembly power receiving port. Further, the power management unit may be configured to be electrically coupled with at least one external power supply system using an input connector assembly. Further, the input connector assembly may include at least one first input connector. Further, the at least one first input connector may be configured to be electrically coupled with at least one external power supply port of the at least one external power supply system. Further, the electrically coupling of the power management unit with the at least one external power supply system may be based on the electrically coupling of the at least one first input connector with the at least one external power supply port. Further, the power management unit may be configured for receiving an input electrical power from the at least one energy storage device based on the electrical energy stored in the at least one energy storage device. Further, the input electrical power may be a direct current power. Further, the power management unit may be configured for supplying an output electrical power to the at least one electrical propulsion assembly based on the receiving of the input electrical power. Further, the supplying of the output electrical power powers the at least one electrical propulsion assembly for propelling the vehicle. Further, the power management unit may be configured for receiving an external input electrical power from the at least one external power supply system through the at least one external power supply port. Further, the supplying of the output electrical power may be based on the receiving of the external input electrical power.

Further disclosed herein is an apparatus for electrically powering a vehicle, in accordance with some embodiments. Accordingly, the apparatus may include at least one energy storage device and a power management unit. Further, the at least one energy storage device may be configured for storing electrical energy. Further, the power management unit may be electrically coupled with the at least one energy storage device. Further, the power management unit may be configured to be electrically coupled with at least one electrical propulsion assembly of the vehicle using an output connector assembly. Further, the output connector assembly may include at least one first output connector. Further, the at least one first output connector may be configured to be electrically coupled with at least one propulsion assembly power receiving port of the at least one electrical propulsion assembly. Further, the electrically coupling of the power management unit with the at least one electrical propulsion assembly may be based on the electrically coupling of the at least one first output connector with the at least one propulsion assembly power receiving port. Further, the power management unit may be configured to be electrically coupled with at least one external power supply system using an input connector assembly. Further, the input connector assembly may include at least one first input connector. Further, the at least one first input connector may be configured to be electrically coupled with at least one external power supply port of the at least one external power supply system. Further, the electrically coupling of the power management unit with the at least one external power supply system may be based on the electrically coupling of the at least one first input connector with the at least one external power supply port. Further, the power management unit may be configured for receiving an input electrical power from the at least one energy storage device based on the electrical energy stored in the at least one energy storage device. Further, the input electrical power may be a direct current power. Further, the power management unit may be configured for supplying an output electrical power to the at least one electrical propulsion assembly based on the receiving of the input electrical power. Further, the supplying of the output electrical power powers the at least one electrical propulsion assembly for propelling the vehicle. Further, the power management unit may be configured for receiving an external input electrical power from the at least one external power supply system through the at least one external power supply port. Further, the external input electrical power supplied by the at least one external power supply system through the at least one external power supply port may be associated with a voltage. Further, the voltage may be 120 volts. Further, the supplying of the output electrical power may be based on the receiving of the external input electrical power.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
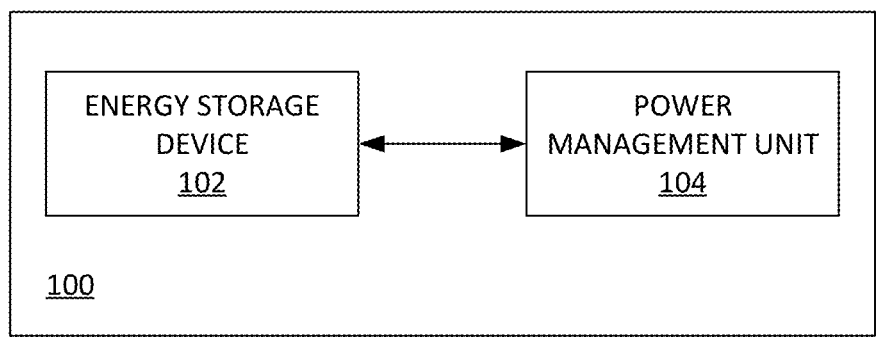
FIG. 1 is a block diagram of an apparatus 100 for electrically powering a vehicle (such as a vehicle 202), in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term-differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for electrically powering a vehicle, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable data (e.g. username, password, passphrase, PIN, secret question, secret answer, etc.) and/or possession of a machine readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smart-card with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes methods, systems, apparatuses, and devices for electrically powering a vehicle.

Further, the disclosed apparatus is a residential EV charger. Further, the residential EV charger may include an EV charging unit with a built-in battery capable of being plugged into a regular 120V outlet at residences thus avoiding the need/cost for installing a 240V outlet. Further, the EV charging unit with the built-in battery is portable to be carried in the electric vehicle (EV) to function as an emergency range extender. Further, the EV charging unit with the built-in battery is configured to be coupled to a renewable energy source such as solar panels to charge the built-in battery.

FIG. 1 is a block diagram of an apparatus 100 for electrically powering a vehicle (such as a vehicle 202), in accordance with some embodiments. Accordingly, the apparatus 100 may include at least one energy storage device 102 and a power management unit 104. Further, the apparatus 100 may include a residential electric vehicle (EV) charger, an electric vehicle (EV) charging unit, etc.

Further, the at least one energy storage device 102 may be configured for storing electrical energy. Further, the at least one energy storage device 102 may include a battery (such as a Li-ion battery, a Li-po battery, etc.), a capacitor, a supercapacitor, an ultracapacitor, a rechargeable battery, a fuel cell, etc. Further, the electrical energy may include direct current electrical energy.

Figure 2:
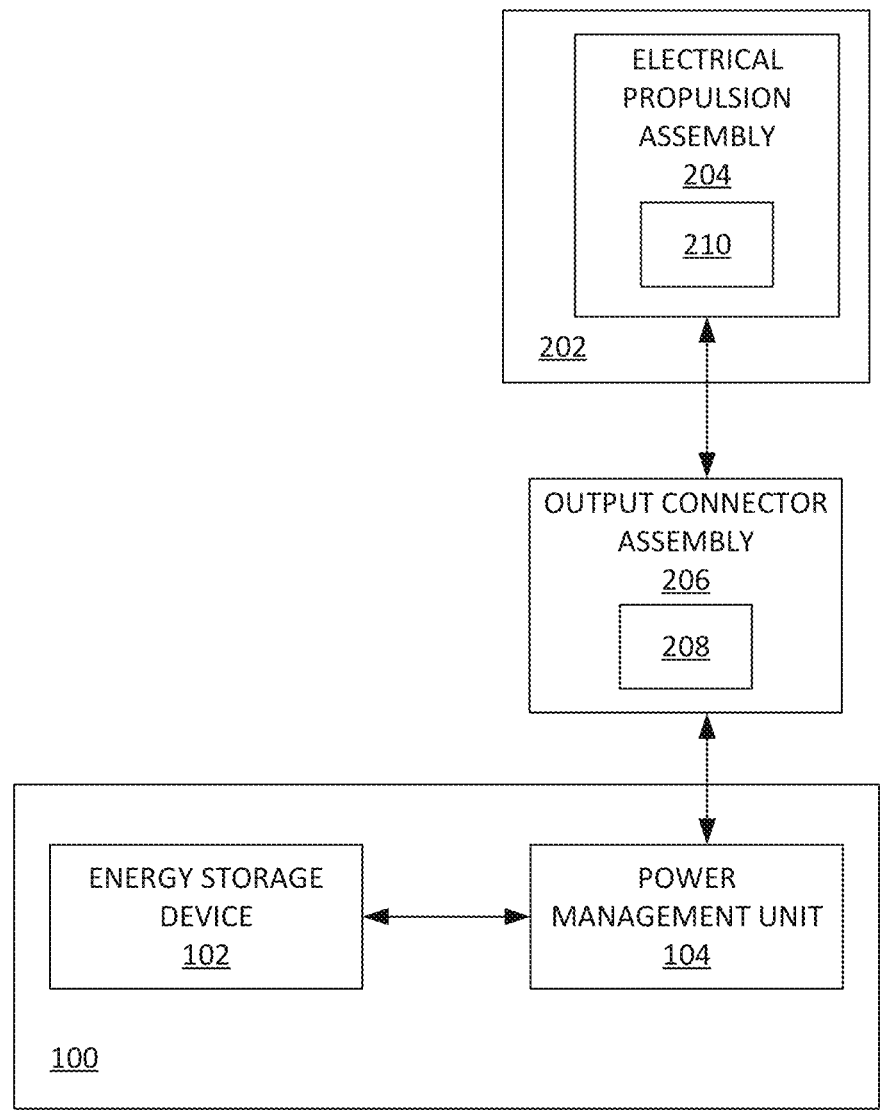
FIG. 2 is a block diagram of the apparatus 100 with the at least one electrical propulsion assembly 204 of the vehicle 202, in accordance with some embodiments.

Further, the power management unit 104 may be electrically coupled with the at least one energy storage device 102. Further, the power management unit 104 may include at least one of an electrical device and an electronic device configured for performing at least one power management function. Further, the at least one power management function may include transferring electrical power, modifying at least one of a current level and a voltage level of the electrical power, converting alternating current power to direct current power, converting direct current power to alternating current power, converting direct current power to direct current power, etc. Further, the power management unit 104 may be a power management device, a power control unit, a power controller, a controller, etc. Further, the power management unit 104 may be configured managing electrical power. Further, the power management unit 104 may include a microprocessor, a microcontroller, etc., for governing the at least one power management function associated with the electrically powering of the vehicle 202. Further, the power management unit 104 may include a voltage regulator, a rectifier, a converter, a transformer, a switch, a current regulator, etc. Further, the power management unit 104 may be programmable, electrically actuated, etc. Further, the power management unit 104 may include a smart coupler based on a smart coupled technology for upgrading a voltage level of electrical power input to the smart coupler and outputting an upgraded voltage level of the electric power. Further, the smart coupler may include an electrical coupler, a transformer (step up transformer), an amplifier, and a smart controller for the electrical coupler, the amplifier, and the transformer. Further, the smart controller controls at least one parameter of at least one of the amplifier and the transformer for upgrading the voltage level of the electrical power input. Further, the power management unit 104 may be configured to be electrically coupled with at least one electrical propulsion assembly 204 of the vehicle 202 using an output connector assembly 206, as shown in FIG. 2. Further, the at least one electrical propulsion assembly 204 may be powered by electrical power. Further, the at least one electrical propulsion assembly 204 may include an electric drive power assembly, an electric propulsion drive assembly, an electric powertrain, an electric drive assembly, etc. Further, the vehicle 202 may include an electric vehicle (EV), a hybrid electric vehicle, an internal combustion (IC)-electric vehicle, a plug-in hybrid electric vehicle, etc. Further, the output connector assembly 206 may include at least one first output connector 208, as shown in FIG. 2. Further, the output connector assembly 206 establishes an electrical connection between the power management unit 104 and the at least one electrical propulsion assembly 204. Further, the at least one first output connector 208 may include an electrical connector, an electrical plug, an electrical receptacle, an electrical socket, an NEMA connector, etc. Further, the at least one first output connector 208 may be configured to be electrically coupled with at least one propulsion assembly power receiving port 210, as shown in FIG. 2, of the at least one electrical propulsion assembly 204. Further, the at least one propulsion assembly power receiving port 210 may include an electrical port, a charging port, an electrical inlet, etc. Further, the at least one first output connector 208 may be configured to be plugged in the at least one propulsion assembly power receiving port 210. Further, the electrically coupling of the power management unit 104 with the at least one electrical propulsion assembly 204 may be based on the electrically coupling of the at least one first output connector 208 with the at least one propulsion assembly power receiving port 210. Further, the power management unit 104 may be configured for receiving an input electrical power from the at least one energy storage device 102 based on the electrical energy stored in the at least one energy storage device 102. Further, the input electrical power may be a direct current power. Further, the power management unit 104 may be configured for supplying an output electrical power to the at least one electrical propulsion assembly 204 based on the receiving of the input electrical power. Further, the supplying of the output electrical power powers the at least one electrical propulsion assembly 204 for propelling the vehicle 202. Further, the output electrical power may be direct current power, alternating current power, etc.

Figure 3:
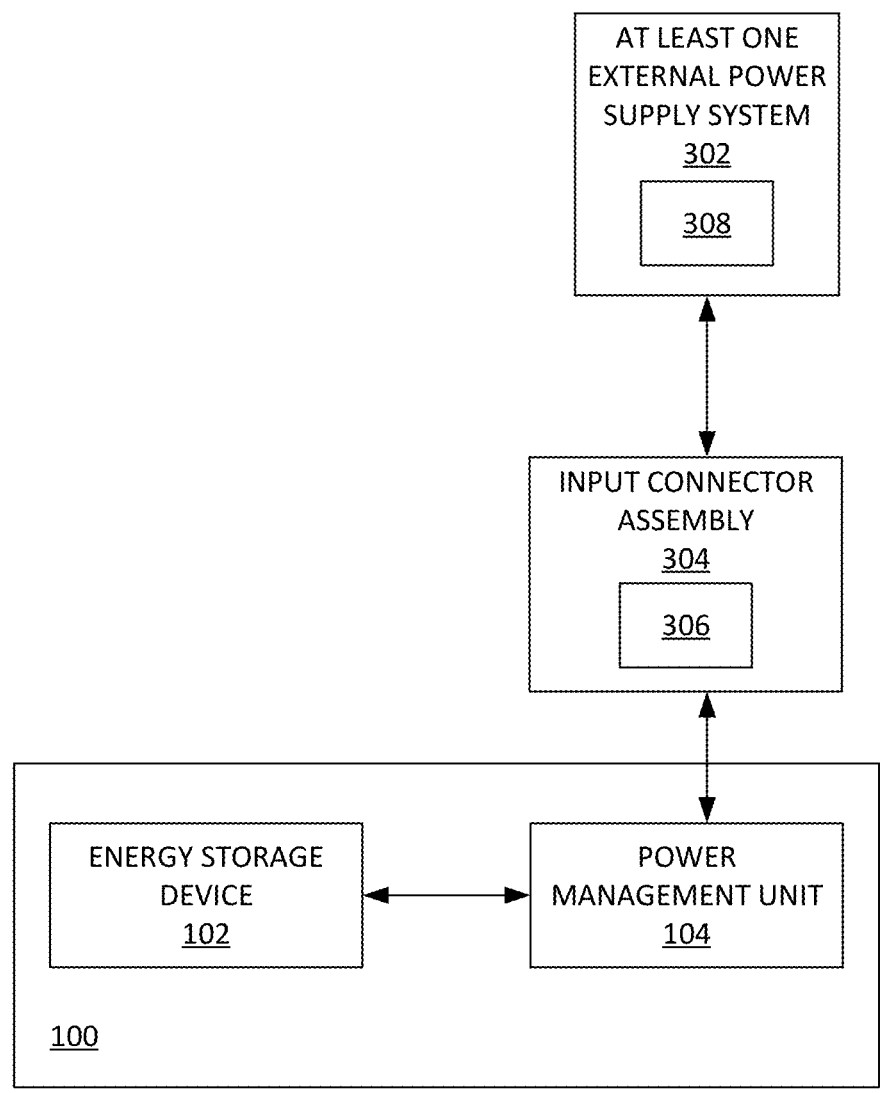
FIG. 3 is a block diagram of the apparatus 100 with the at least one external power supply system 302, in accordance with some embodiments.

Further, in some embodiments, the power management unit 104 may be configured to be electrically coupled with at least one external power supply system 302 using an input connector assembly 304, as shown in FIG. 3. Further, the input connector assembly 302 establishes an electrical connection between the power management unit 104 and the at least one external power supply system 302. Further, the at least one external power supply system 302 may be a power supply system external to the vehicle 202. Further, the at least one external power supply system 302 may be a power supply system of a household, a residence, etc. Further, the input connector assembly 304 may include at least one first input connector 306, as shown in FIG. 3. Further, the at least one first input connector 306 may include an electric coupler, a smart coupler, an electrical connector, an electrical plug, an electrical receptacle, an electrical socket, a National Electrical Manufacturers Association (NEMA) connector (such as NEMA 5-15P plug, NEMA 5-20P plug, NEMA 1-15P plug, etc.), etc. Further, the at least one first input connector 306 may be configured to be electrically coupled with at least one external power supply port 308, as shown in FIG. 3, of the at least one external power supply system 302. Further, the at least one external power supply port 308 may include an electrical socket, an electrical outlet, a wall outlet, an electrical port, etc. Further, the at least one external power supply port 308 may include a National Electrical Manufacturers Association (NEMA) outlet (such as NEMA 5-15R outlet, NEMA 5-20R outlet, NEMA 5-15P outlet, etc.). Further, the electrically coupling of the power management unit 104 with the at least one external power supply system 302 may be based on the electrically coupling of the at least one first input connector 306 with the at least one external power supply port 308. Further, the power management unit 104 may be configured for receiving an external input electrical power from the at least one external power supply system 302 through the at least one external power supply port 308. Further, the supplying of the output electrical power may be based on the receiving of the external input electrical power.

Figure 4:
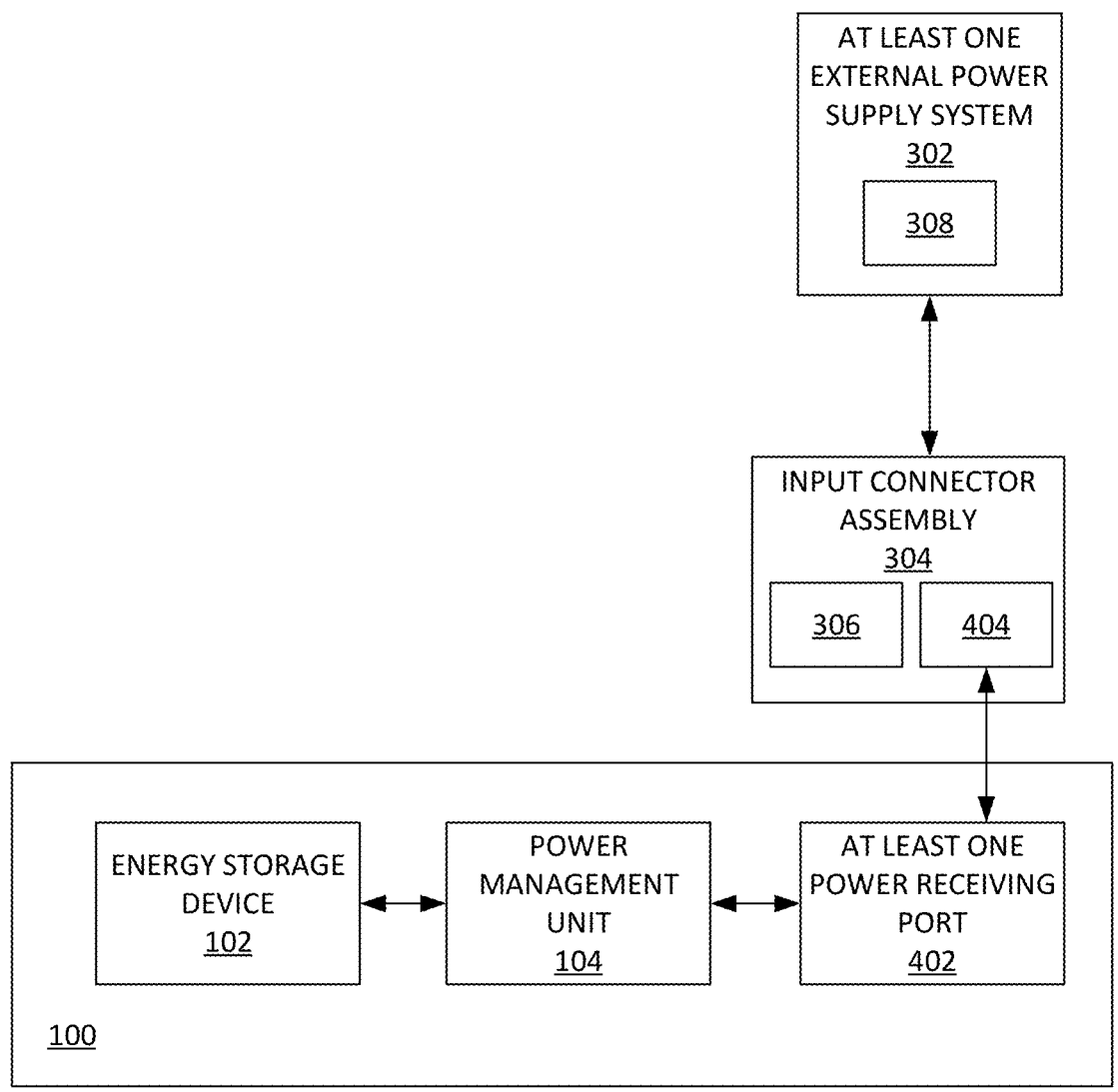
FIG. 4 is a block diagram of the apparatus 100 with the at least one external power supply system 302, in accordance with some embodiments.

In an embodiment, the apparatus 100 may include at least one power receiving port 402, as shown in FIG. 4. Further, the at least one power receiving port 402 may include an electrical socket, an electrical inlet, an electrical port, etc. Further, the at least one power receiving port 402 may be electrically coupled with the power management unit 104. Further, the input connector assembly 304 may include at least one second input connector 404, as shown in FIG. 4. Further, the at least one second input connector 404 may include an electrical connector, an electrical plug, an electrical receptacle, an electrical socket, a National Electrical Manufacturers Association (NEMA) connector (such as NEMA 5-15P plug, NEMA 5-20P plug, NEMA 1-15P plug, etc.), etc. Further, the at least one second input connector 404 may be electrically coupled with the at least one power receiving port 402. Further, the electrically coupling of the power management unit 104 with the at least one external power supply system 302 may be based on the electrically coupling of the at least one second input connector 404 with the at least one power receiving port 402. Further, the input connector assembly 304 may include an electrical conduit (such as a wire, a cable, etc.) comprising the at least one first input connector 306 comprised in at least one first end of the electrical conduit, and the at least one second input connector 404 comprised in at least one second end of the electrical conduit.

Further, in an embodiment, the external input electrical power supplied by the at least one external power supply system 302 through the at least one external power supply port 308 may be associated with a voltage and a frequency. Further, the voltage ranges from 110-120 volts. Further, the frequency may be 60 hertz. Further, the smart coupler may be configured for upgrading the voltage which ranges from 110-120 volts, of the external input electrical power to a voltage that ranges from 220-240 volts, of the output electrical power.

Figure 5:
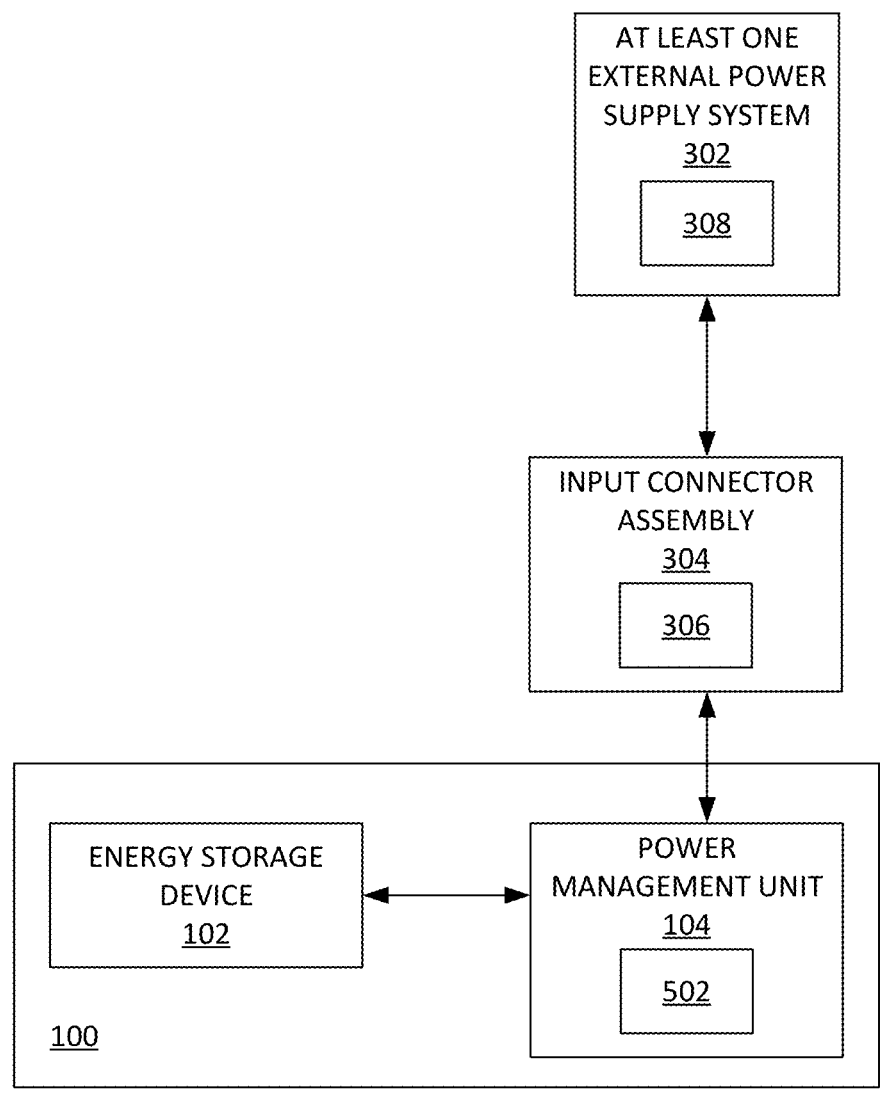
FIG. 5 is a block diagram of the apparatus 100 with the at least one external power supply system 302, in accordance with some embodiments.

Further, in an embodiment, the external input electrical power may be an alternating current power. Further, the power management unit 104 may include at least one first power conversion unit 502, as shown in FIG. 5. Further, the at least one first power conversion unit 502 may be configured for converting the external input electrical power from the alternating current power to a direct current power based on the receiving of the external input electrical power. Further, the at least one first power conversion unit 502 may include an alternating current (AC)-direct current (DC) converter comprising a rectifier, a filter, etc. Further, the supplying of the output electrical power may be based on the converting of the external input electrical power from the alternating current power to the direct current power. Further, the output electrical power may be a direct current power.

Further, in an embodiment, the external input electrical power may be the direct current power with at least one first electrical characteristic based on the converting. Further, the at least one first electrical characteristic may include a voltage level, a current level, a power level, a distortion, etc. Further, the at least one first power conversion unit 502 may be configured for converting the external input electrical power from the direct current power with the at least one first electrical characteristic to a direct current power with at least one second electrical characteristic. Further, the at least one first power conversion unit 502 may include a direct current (DC)-direct current (DC) converter, a buck converter, a buck converter, a buck-boost converter, a Cuk converter, a coupled inductor voltage multiplier cell, etc. Further, the at least one second electrical characteristic may include a specific voltage level, a specific current level, a specific power level, a specific distortion, etc. Further, the supplying of the output electrical power may be based on the converting of the external input electrical power from the direct current power associated with the at least one first electrical characteristic to the direct current power with the at least one second electrical characteristic. Further, the output electrical power may be the direct current power associated with the at least one second electrical characteristic. Further, the specific voltage level may be higher than the voltage level, the specific current level may be higher than the current level, the specific power level may be higher than the power level, etc.

Further, in an embodiment, the power management unit 104 may be configured for supplying an additional electrical output power to the at least one energy storage device 102 for charging the at least one energy storage device 102 based on the converting of the external input electrical power from the alternating current power to the direct current power. Further, the additional electrical output power may be a direct current power.

In further embodiments, the apparatus 100 may include a body comprising each of the at least one energy storage device 102 and the power management unit 104. Further, the body may be configured to be removably disposed with the vehicle 202. Further, the body may be portable for allowing the removably disposing the body with the vehicle 202. Further, the body may be placed in the vehicle 202, attached to the vehicle 202, placed on the vehicle 202, etc.

Figure 6:
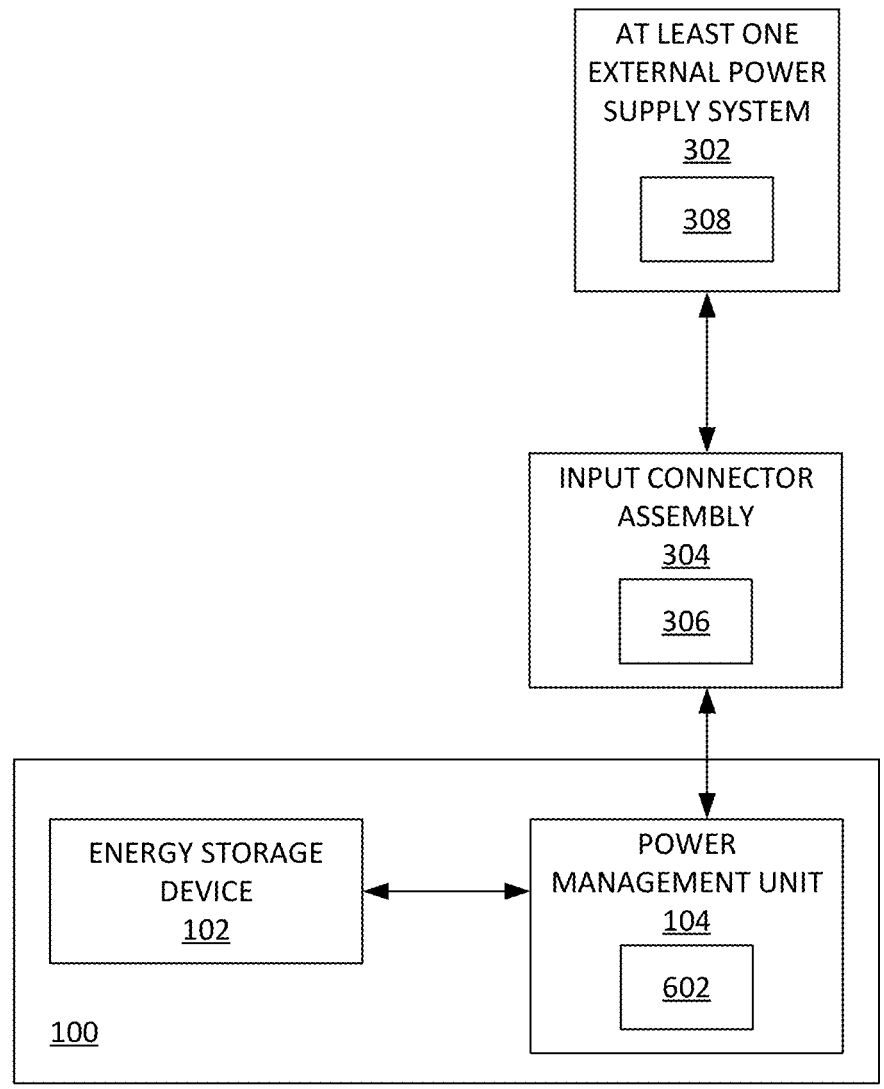
FIG. 6 is a block diagram of the apparatus 100 with the at least one external power supply system 302, in accordance with some embodiments.

Further, in some embodiments, the input electrical power received from the at least one energy storage device 102 may be the direct current power with at least one first electrical characteristic. Further, the power management unit 104 may include a second power conversion unit 602, as shown in FIG. 6. Further, the second power conversion unit 602 may be configured for converting the input electrical power from the direct current power associated with the at least one first electrical characteristic to a direct current power associated with at least one second electrical characteristic based on the receiving. Further, the second power conversion unit 602 may include a direct current (DC)-direct current (DC) converter, a buck converter, a buck converter, a buck-boost converter, etc. Further, the supplying of the output electrical power may be based on the converting of the input electrical power from the direct current power associated with the at least one first electrical characteristic to the direct current power with the at least one second electrical characteristic. Further, the output electrical power may be the direct current power with the at least one second electrical characteristic.

Figure 7:
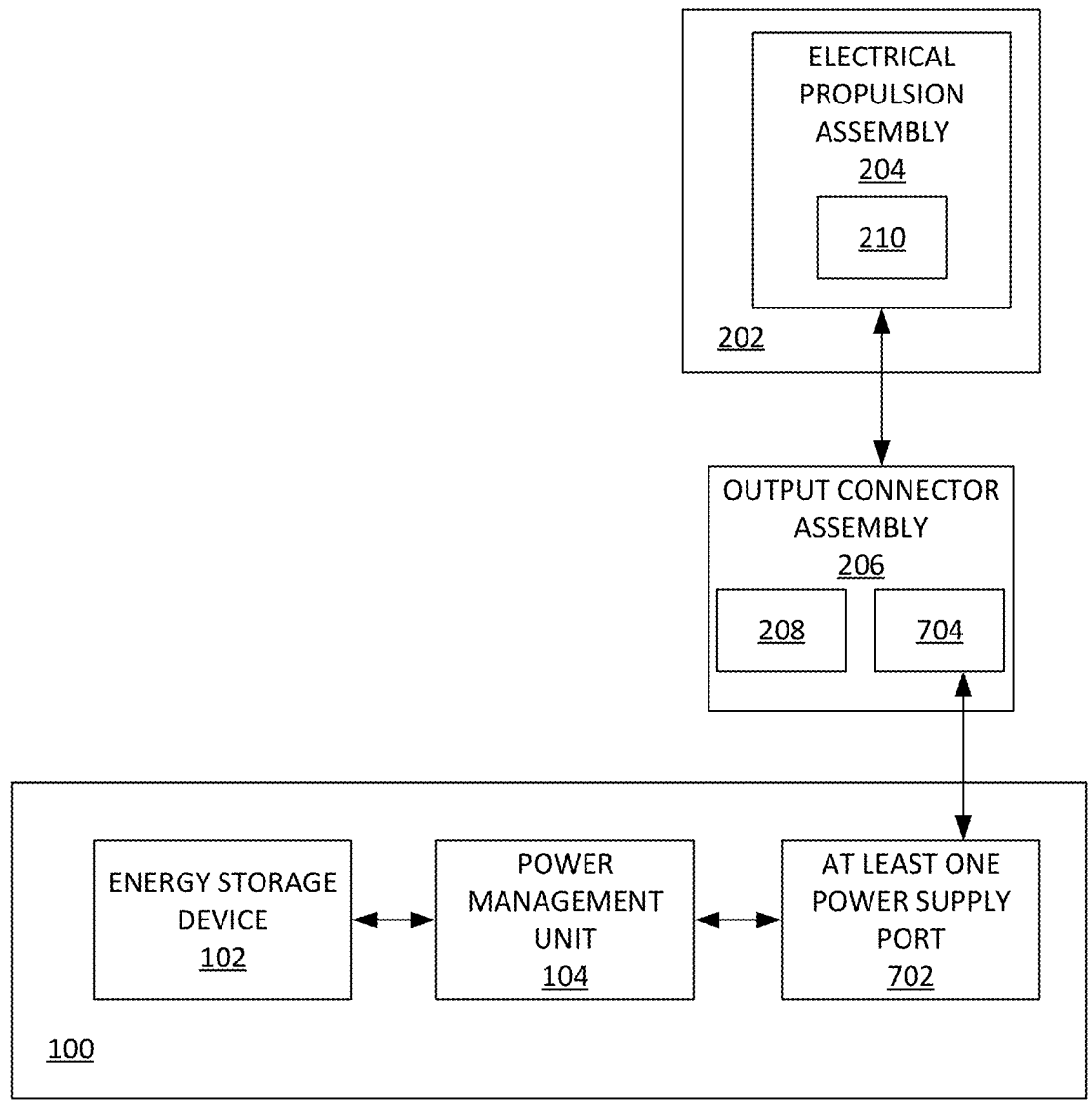
FIG. 7 is a block diagram of the apparatus 100 with the at least one electrical propulsion assembly 204 of the vehicle 202, in accordance with some embodiments.

In further embodiments, the apparatus 100 may include at least one power supply port 702, as shown in FIG. 7. Further, the at least one power supply port 702 may include an electrical socket, an electrical outlet, an electrical port, a National Electrical Manufacturers Association (NEMA) outlet (such as NEMA 5-15R outlet, NEMA 5-20R outlet, NEMA 5-15P outlet, etc.), etc. Further, the at least one power supply port 702 may be electrically coupled with the power management unit 104. Further, the output connector assembly 206 may include at least one second output connector 704, as shown in FIG. 7. Further, the at least one second output connector 704 may include an electrical connector, an electrical plug, an electrical receptacle, an electrical socket, a National Electrical Manufacturers Association (NEMA) connector (such as NEMA 5-15P plug, NEMA 5-20P plug, NEMA 1-15P plug, etc.), etc. Further, the at least one second output connector 704 may be electrically coupled with the at least one power supply port 702. Further, the electrically coupling of the output connector assembly 206 with the power management unit 104 may be based on the electrically coupling of the at least one second output connector 704 with the at least one power supply port 702. Further, the output connector assembly 206 may include an electrical conduit (such as a wire, a cable, etc.) comprising the at least one first output connector 208 comprised in at least one first end of the electrical conduit, and the at least one second output connector 704 comprised in at least one second end of the electrical conduit.

Further, in some embodiments, the power management unit 104 may be configured to be electrically coupled with at least one electrical power receiving device using the output connector assembly 206. Further, the at least one electrical power receiving device may include a home appliance, an appliance, an electrical device, an electronic device, a computing device, etc. Further, the power management unit 104 may act as a power bank. Further, the output connector assembly 206 may include at least one auxiliary output connector. Further, the at least one auxiliary output connector may be configured to be electrically coupled with at least one device port of the at least one electrical power receiving device. Further, the electrically coupling of the power management unit 104 with the at least one power receiving device may be based on the electrically coupling of the at least one auxiliary output connector with the at least one device port. Further, the power management unit 104 may be further configurable for supplying an auxiliary output electrical power to the at least one electrical power receiving device based on the receiving of the input electrical power. Further, the supplying of the auxiliary output electrical power powers the at least one power receiving device.

Figure 8:
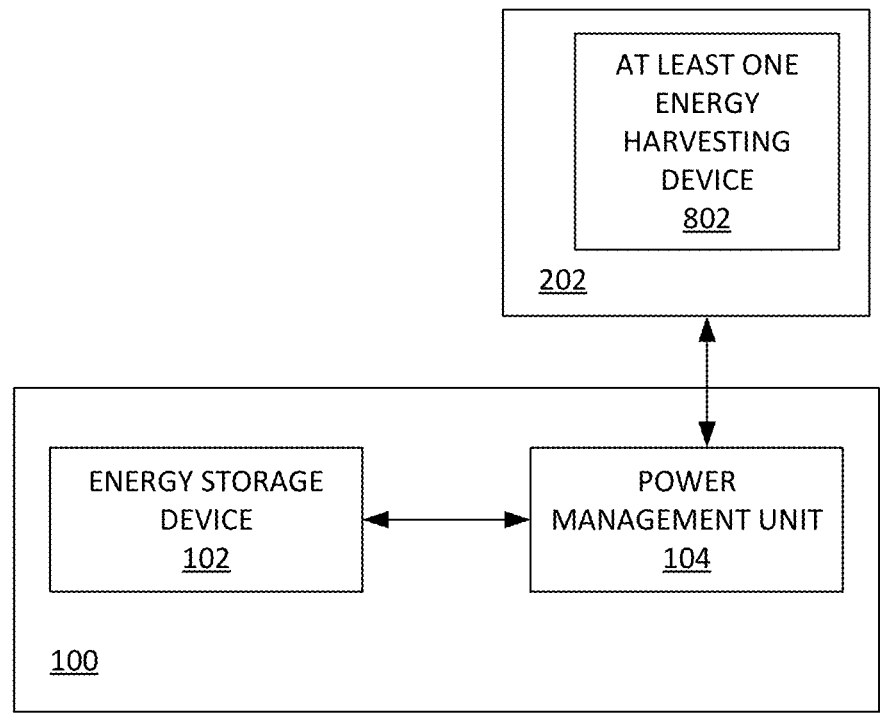
FIG. 8 is a block diagram of the apparatus 100 with the at least one energy harvesting device 802 associated with the vehicle 202, in accordance with some embodiments.

Further, in some embodiments, the power management unit 104 may be configured to be electrically coupled with at least one energy harvesting device 802, as shown in FIG. 8. Further, the at least one energy harvesting device 802 may include a solar panel, a piezoelectric generator, a thermoelectric generator, a radio frequency (RF) energy harvester, a wind energy harvester, etc. Further, the at least one energy harvesting device 802 may be configured for harvesting electrical energy from at least one energy source. Further, the at least one energy source may include at least one renewable energy source. Further, the at least one energy source may include sunlight, vibration, temperature, RF waves, wind, etc. Further, the at least one energy harvesting device 802 may be configured for generating an additional electrical power based on the harvesting. Further, the power management unit 104 may be configured for receiving the additional electrical power from the at least one energy harvesting device 802 based on the generating of the additional electrical power. Further, the power management unit 104 may be configured for supplying the additional electrical power to the at least one energy storage device 102 for charging the at least one energy storage device 102 based on the receiving of the additional electrical power from the at least one energy harvesting device 802.

Further, in an embodiment, the at least one energy harvesting device 802 may be disposed with the vehicle 202. Further, the harvesting of the electrical energy from the at least one energy source may be during at least one operation of the vehicle 202. Further, the at least one operation may include a driving operation, a parking operation, etc.

Further, in some embodiments, the at least one energy harvesting device 802 may be configured to be stationarily placed on at least one surface exterior to the vehicle 202. Further, the at least one surface may include a ground surface, a curbside surface, a road surface, a plain surface, etc. Further, the harvesting of the electrical energy may be based on the stationarily placing of the at least one energy harvesting device 802. Further, the vehicle 202 may be in a stationary condition while the at least one energy harvesting device 802 may be stationarily placed on the at least one surface. Further, the vehicle 202 may not be moving in the stationary condition.

Figure 9:
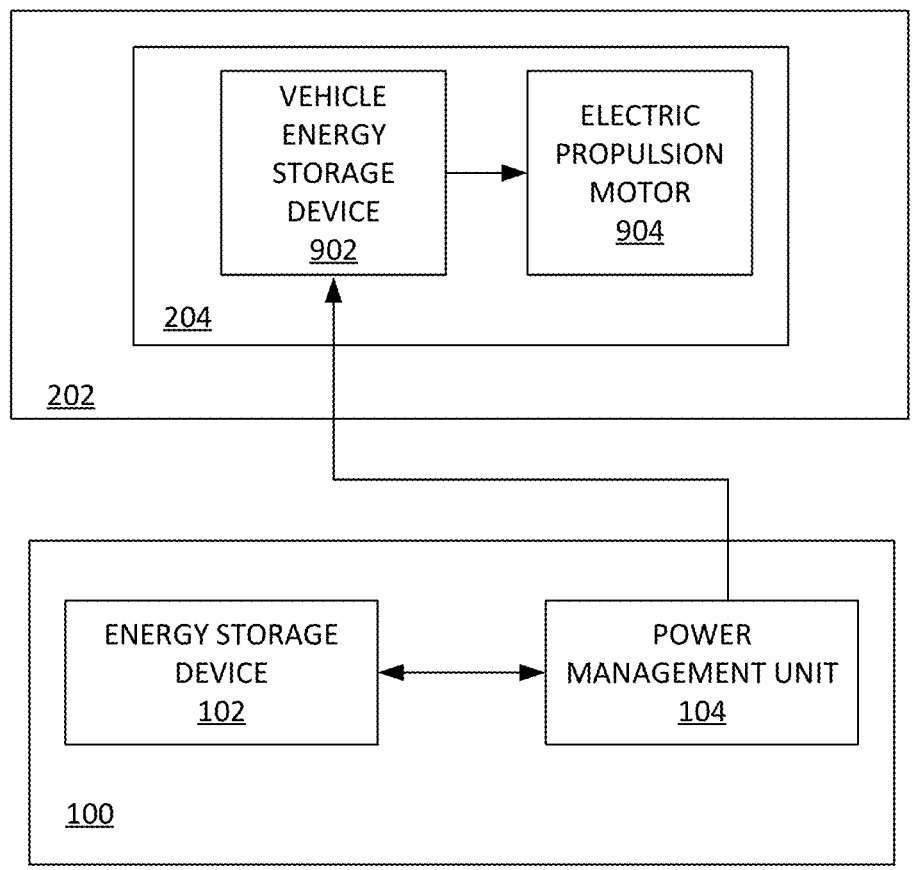
FIG. 9 is a block diagram of the apparatus 100 with the at least one electrical propulsion assembly 204 of the vehicle 202, in accordance with some embodiments.

Further, in some embodiments, the at least one electrical propulsion assembly 204 may include at least one vehicle energy storage device 902 and at least one electric propulsion motor 904, as shown in FIG. 9. Further, the at least one vehicle energy storage device 902 may include a battery (such as a Li-ion battery, a Li-po battery, etc.), a capacitor, a supercapacitor, an ultracapacitor, a rechargeable battery, a fuel cell, etc. Further, the at least one electric propulsion motor 904 may include a permanent magnet synchronous motor, an induction motor, a switched reluctance motor, a brushless DC motor, etc. Further, the at least one electric propulsion motor 904 may be electrically coupled with the at least one vehicle energy storage device 902. Further, the at least one electric propulsion motor 904 may be powered by the at least one vehicle energy storage device 902. Further, the electrically coupling of the power management unit 104 with the at least one electrical propulsion assembly 204 may include electrically coupling of the power management unit 104 with the at least one vehicle energy storage device 902. Further, the supplying of the output electrical power to the at least one electrical propulsion assembly 204 may include supplying the output electrical power to the at least one vehicle energy storage device 902 for charging the at least one vehicle energy storage device 902 based on the electrically coupling of the power management unit 104 with the at least one vehicle energy storage device 902. Further, a capacity, an output, and a voltage of the at least one vehicle energy storage device 902 may be less than a capacity, an output, and a voltage of the at least one energy storage device 102.

Figure 10:
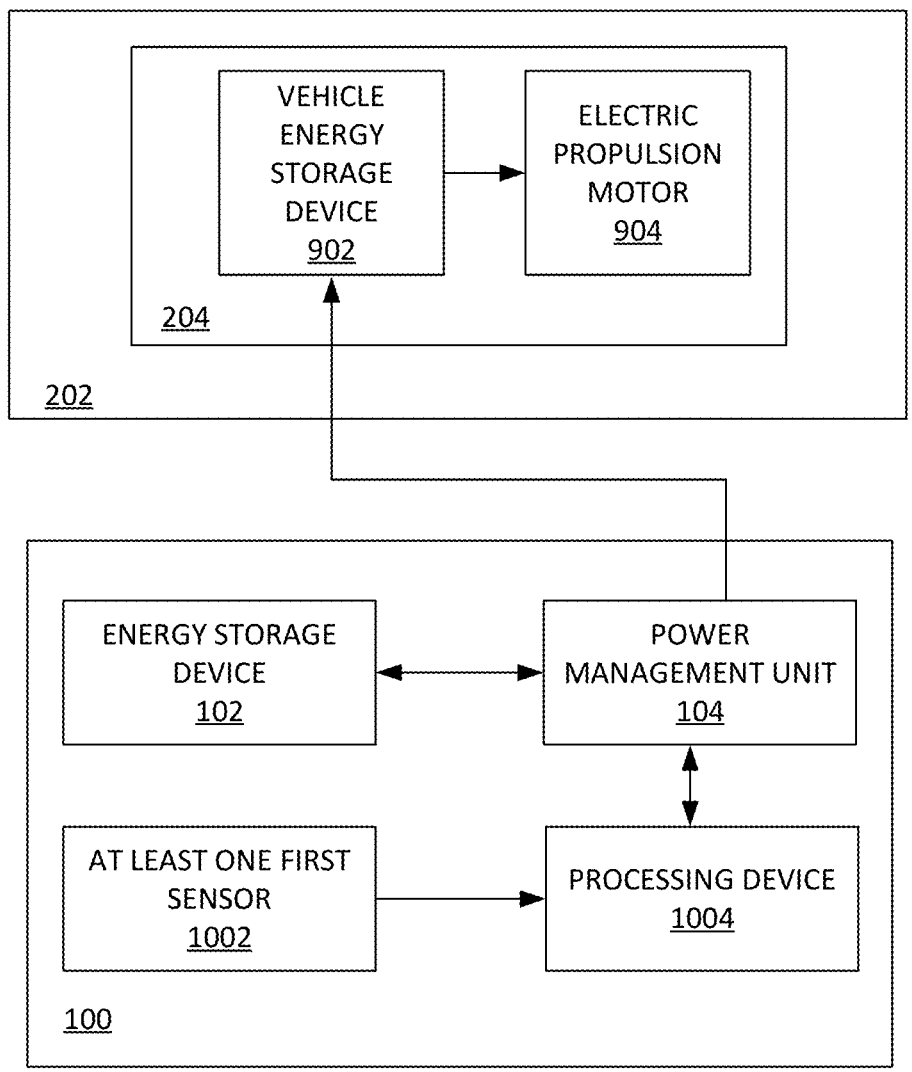
FIG. 10 is a block diagram of the apparatus 100 with the at least one electrical propulsion assembly 204 of the vehicle 202, in accordance with some embodiments.

In an embodiment, the apparatus 100 may include at least one first sensor 1002 and a processing device 1004, as shown in FIG. 10. Further, the at least one first sensor 1002 may be configured for detecting a state of charge of the at least one vehicle energy storage device 902. Further, the at least one first sensor 1002 may include a battery charge sensor. Further, the at least one first sensor 1002 may include a voltage sensor, a current sensor, a temperature sensor, etc. Further, the processing device 1004 may be communicatively coupled with the at least one first sensor 1002. Further, the processing device 1004 may be configured for generating at least one data based on the detecting of the state of charge of the at least one vehicle energy storage device 902. Further, the processing device 1004 may be configured for analyzing the at least one data based on at least one charging initiation criterion. Further, the at least one charging initiation criterion may include at least one charge level of the at least one vehicle energy storage device 902 for which the charging of the at least one vehicle energy storage device 902 may require to be initiated. Further, the processing device 1004 may be configured for determining an initiation of the charging of the at least one vehicle energy storage device 902 based on the analyzing of the at least one data based on the at least one charging initiating criterion. Further, the processing device 1004 may be configured for generating at least one charging initiating command for the power management unit 104 based on the determining of the initiation of the charging of the at least one vehicle energy storage device 902. Further, the processing device 1004 may be operatively coupled with the power management unit 104. Further, the supplying of the output electrical power to the at least one vehicle energy storage device 902 for the charging of the at least one vehicle energy storage device 902 may be initiated based on the at least one charging initiating command.

Further, in an embodiment, the at least one first sensor 1002 may be configured for detecting a current state of charge of the at least one vehicle energy storage device 902 after elapsing of at least one time period from the initiating of the supplying of the output electrical power. Further, the processing device 1004 may be configured for generating at least one current data based on the detecting of the current state of charge. Further, the processing device 1004 may be configured for analyzing the at least one current data based on at least one charging termination criterion. Further, the at least one charging termination criterion may include at least one charge level of the at least one vehicle energy storage device 902 for which the charging of the at least one vehicle energy storage device 902 may require to be terminated. Further, the processing device 1004 may be configured for determining a termination of the charging of the at least one power storage unit based on the analyzing of the at least one data based on the at least one charging termination criterion. Further, the processing device 1004 may be configured for generating at least one charging termination command for the power management unit 104 based on the determination of the charging. Further, the supplying of the output electrical power to the at least one vehicle energy storage device 902 may be terminated based on the at least one charging termination command.

Figure 11:
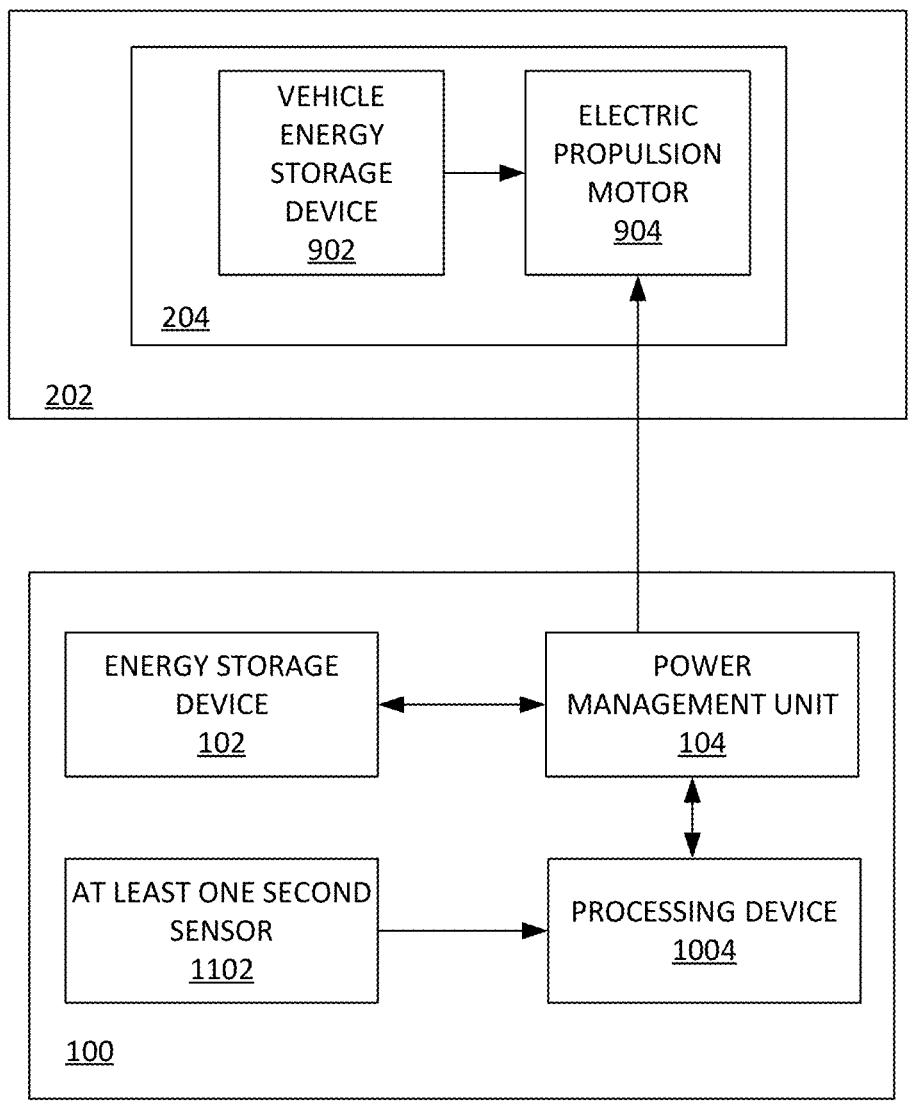
FIG. 11 is a block diagram of the apparatus 100 with the at least one electrical propulsion assembly 204 of the vehicle 202, in accordance with some embodiments.

Further, in some embodiments, the at least one electrical propulsion assembly 204 may include the at least one vehicle energy storage device 902 and the at least one electric propulsion motor 904. Further, the at least one electric propulsion motor 904 may be electrically coupled with the at least one vehicle energy storage device 902. Further, the electrically coupling of the power management unit 104 with the at least one electrical propulsion assembly 204 may include electrically coupling of the power management unit 104 with the at least one electric propulsion motor 904. Further, the apparatus 100 may include at least one second sensor 1102, as shown in FIG. 11, and the processing device 1004. Further, the at least one second sensor 1102 may be configured for detecting at least one parameter associated with the at least one vehicle energy storage device 902. Further, the at least one second sensor 1102 may include a voltage sensor, a current sensor, a temperature, sensor, an impedance sensor, etc. Further, the at least one parameter may include a rate of change in a state of charge, a rate of change in a discharge current, a rate of change in a voltage, a rate of change in a temperature, a discharge rate, etc. Further, the processing device 1004 may be communicatively coupled with the at least one second sensor 1102. Further, the processing device 1004 may be configured for generating at least one parameter data based on the detecting of the at least one parameter. Further, the processing device 1004 may be configured for analyzing the at least one parameter data. Further, the processing device 1004 may be configured for determining a requirement for the at least one electric propulsion motor 904 based on the analyzing of the at least one parameter data. Further, the requirement may include a voltage level, a current capacity, a discharge rate, an energy density, etc. Further, the processing device 1004 may be configured for generating at least one command for the power management unit 104 based on the requirement. Further, the processing device 1004 may be operatively coupled with the power management unit 104. Further, the supplying of the output electrical power to the at least one electrical propulsion assembly 204 may include supplying the output electrical power to the at least one electric propulsion motor 904 based on the at least one command. Further, in an embodiment, the analyzing of the at least one data may include analyzing the at least one machine learning model. Further, the at least one machine learning model may be trained using a plurality of historical data associated with at least one historical value of the at least one parameter. Further, the at least one machine learning model may be configured for detecting at least one of a pattern and a correlation in the at least one parameter data indicative of the requirement for the at least one electric propulsion motor 904 for at least one time period. Further, the determining of the requirement may be based on the detecting of at least one of the pattern and the correlation in the at least one parameter data. Further, the at least one machine learning model may deploy a transformer architecture for detecting patterns and correlations within the at least one parameter data. Further, the at least one machine learning model may include at least one convolutional neural network (CNN) layer for extracting at least one feature from the at least one parameter data, and at least one long short term memory (LSTM) layer for capturing at least one temporal pattern in the at least one parameter data.

Figure 12:
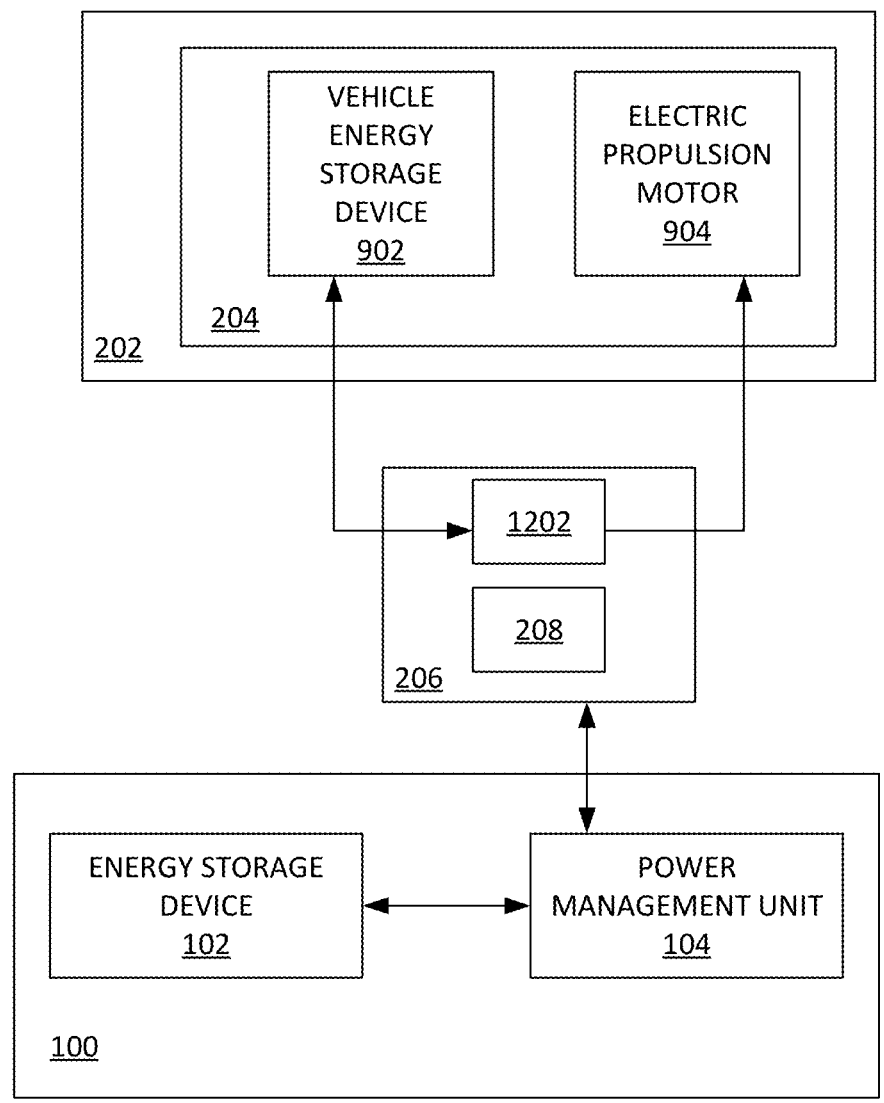
FIG. 12 is a block diagram of the apparatus 100 with the at least one electrical propulsion assembly 204 of the vehicle 202, in accordance with some embodiments.

Further, in some embodiments, the at least one electrical propulsion assembly 204 may include the at least one vehicle energy storage device 902 and the at least one electric propulsion motor 904. Further, the output connector assembly 206 may include at least one switch 1202, as shown in FIG. 12. Further, the electrically coupling of the power management unit 104 with the at least one electrical propulsion assembly 204 using the output connector assembly 206 comprises electrically coupling of the power management unit 104 with the at least one vehicle energy storage device 902 and the at least one electric propulsion motor 904 using the at least one switch 1202. Further, the at least one switch 1202 may be electrically actuated. Further, the at least one switch 12025 may include a switching device, a relay switch, a solid state switch, an automatic transfer switch, a power switch, a thyristor, etc. Further, the at least one switch 1202 may be configured to be transitioned between a plurality of states. Further, the supplying of the output electrical power may include supplying the output electrical power to the at least one electric propulsion motor 904. Further, the at least one switch 1202 allows the supplying of the output electrical power to the at least one electric propulsion motor 904 in a first state of the plurality of states, and restricts electrically powering of the at least one electric propulsion motor 904 from the at least one vehicle energy storage device 902. Further, the at least one switch 1202 restricts the supplying of the output electrical power to the at least one electric propulsion motor 904 in a second state of the plurality of states, and allows the electrically powering of the at least one electric propulsion motor 904 from the at least one vehicle energy storage device 902.

In an embodiment, the apparatus 100 may include the processing device 1004 operatively coupled with the at least one switch 1202. Further, the processing device 1004 may be configured for generating at least one switching command for the transitioning of the at least one switch 1202 based on at least one switching criterion. Further, the at least one switching criterion may include a time of operation, a duration of operation, an instance of operation, a condition of operation, etc., associated with each of the at least one energy storage device 102 and the at least one vehicle energy storage device 902. Further, the transitioning of the at least one switch 1202 may be further based on the at least one switching command.

FIG. 2 is a block diagram of the apparatus 100 with the at least one electrical propulsion assembly 204 of the vehicle 202, in accordance with some embodiments.

FIG. 3 is a block diagram of the apparatus 100 with the at least one external power supply system 302, in accordance with some embodiments.

FIG. 4 is a block diagram of the apparatus 100 with the at least one external power supply system 302, in accordance with some embodiments.

FIG. 5 is a block diagram of the apparatus 100 with the at least one external power supply system 302, in accordance with some embodiments.

FIG. 6 is a block diagram of the apparatus 100 with the at least one external power supply system 302, in accordance with some embodiments.

FIG. 7 is a block diagram of the apparatus 100 with the at least one electrical propulsion assembly 204 of the vehicle 202, in accordance with some embodiments.

FIG. 8 is a block diagram of the apparatus 100 with the at least one energy harvesting device 802 associated with the vehicle 202, in accordance with some embodiments.

FIG. 9 is a block diagram of the apparatus 100 with the at least one electrical propulsion assembly 204 of the vehicle 202, in accordance with some embodiments.

FIG. 10 is a block diagram of the apparatus 100 with the at least one electrical propulsion assembly 204 of the vehicle 202, in accordance with some embodiments.

FIG. 11 is a block diagram of the apparatus 100 with the at least one electrical propulsion assembly 204 of the vehicle 202, in accordance with some embodiments.

FIG. 12 is a block diagram of the apparatus 100 with the at least one electrical propulsion assembly 204 of the vehicle 202, in accordance with some embodiments.

Figure 13:
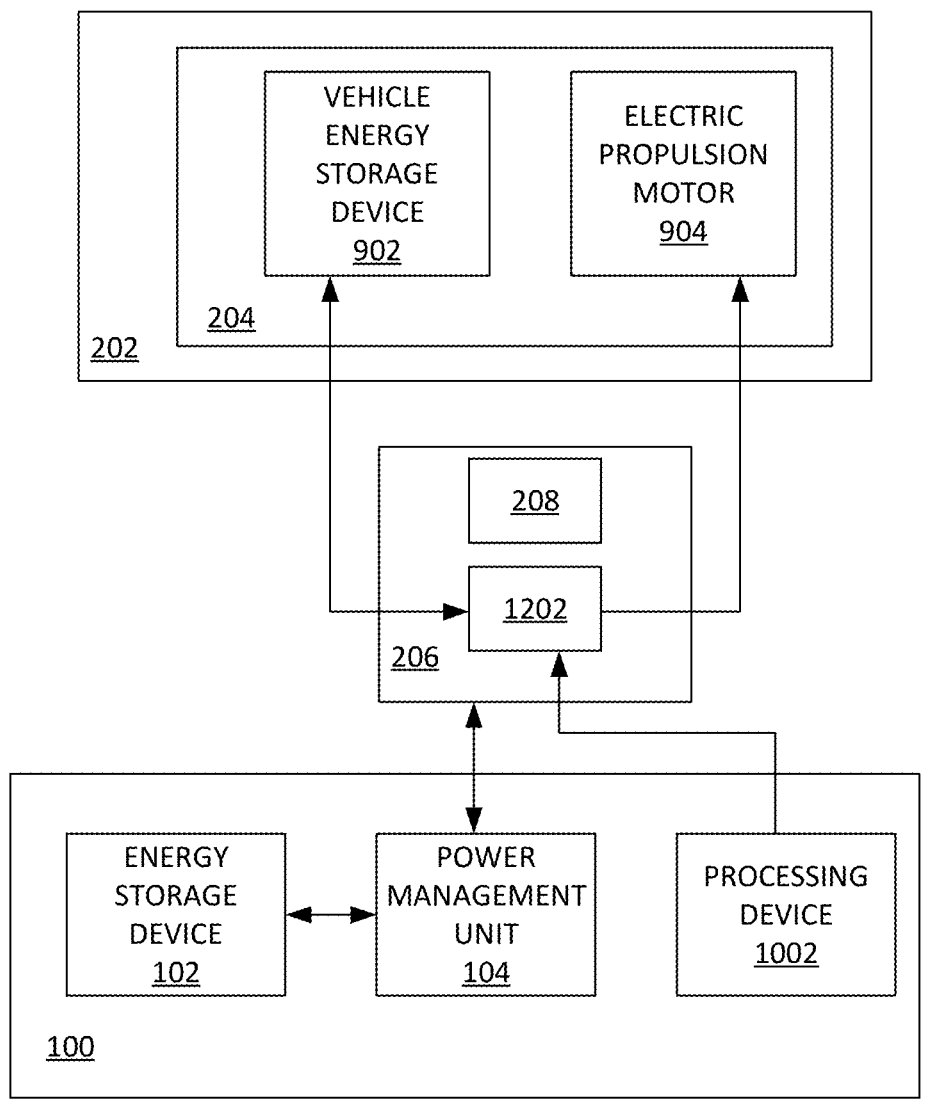
FIG. 13 is a block diagram of the apparatus 100 with the at least one electrical propulsion assembly 204 of the vehicle 202, in accordance with some embodiments.

FIG. 13 is a block diagram of the apparatus 100 with the at least one electrical propulsion assembly 204 of the vehicle 202, in accordance with some embodiments.

Figure 14:
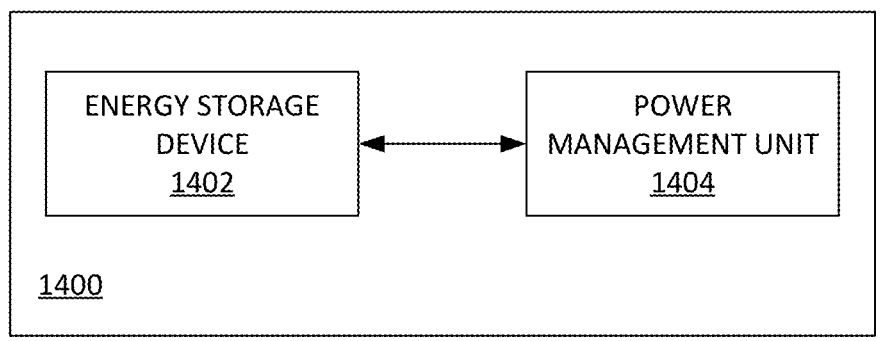
FIG. 14 is a block diagram of an apparatus 1400 for electrically powering a vehicle, in accordance with some embodiments.

FIG. 14 is a block diagram of an apparatus 1400 for electrically powering a vehicle, in accordance with some embodiments. Accordingly, the apparatus 1400 may include at least one energy storage device 1402 and a power management unit 1404.

Further, the at least one energy storage device 1402 may be configured for storing electrical energy.

Further, the power management unit 1404 may be electrically coupled with the at least one energy storage device 1402. Further, the power management unit 1404 may be configured to be electrically coupled with at least one electrical propulsion assembly of the vehicle using an output connector assembly. Further, the output connector assembly may include at least one first output connector. Further, the at least one first output connector may be configured to be electrically coupled with at least one propulsion assembly power receiving port of the at least one electrical propulsion assembly. Further, the electrically coupling of the power management unit 1404 with the at least one electrical propulsion assembly may be based on the electrically coupling of the at least one first output connector with the at least one propulsion assembly power receiving port. Further, the power management unit 1404 may be configured to be electrically coupled with at least one external power supply system using an input connector assembly. Further, the input connector assembly may include at least one first input connector. Further, the at least one first input connector may be configured to be electrically coupled with at least one external power supply port of the at least one external power supply system. Further, the electrically coupling of the power management unit 1404 with the at least one external power supply system may be based on the electrically coupling of the at least one first input connector with the at least one external power supply port. Further, the power management unit 1404 may be configured for receiving an input electrical power from the at least one energy storage device 1402 based on the electrical energy stored in the at least one energy storage device 1402. Further, the input electrical power may be a direct current power. Further, the power management unit 1404 may be configured for supplying an output electrical power to the at least one electrical propulsion assembly based on the receiving of the input electrical power. Further, the supplying of the output electrical power powers the at least one electrical propulsion assembly for propelling the vehicle. Further, the power management unit 1404 may be configured for receiving an external input electrical power from the at least one external power supply system through the at least one external power supply port. Further, the supplying of the output electrical power may be further based on the receiving of the external input electrical power.

Figure 15:
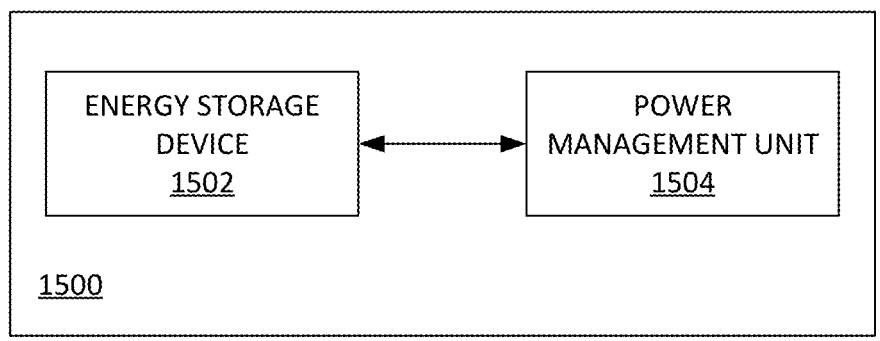
FIG. 15 is a block diagram of an apparatus 1500 for electrically powering a vehicle, in accordance with some embodiments.

FIG. 15 is a block diagram of an apparatus 1500 for electrically powering a vehicle, in accordance with some embodiments. Accordingly, the apparatus 1500 may include at least one energy storage device 1502 and a power management unit 1504.

Further, the at least one energy storage device 1502 may be configured for storing electrical energy.

Further, the power management unit 1504 may be electrically coupled with the at least one energy storage device 1502. Further, the power management unit 1504 may be configured to be electrically coupled with at least one electrical propulsion assembly of the vehicle using an output connector assembly. Further, the output connector assembly may include at least one first output connector. Further, the at least one first output connector may be configured to be electrically coupled with at least one propulsion assembly power receiving port of the at least one electrical propulsion assembly. Further, the electrically coupling of the power management unit 1504 with the at least one electrical propulsion assembly may be based on the electrically coupling of the at least one first output connector with the at least one propulsion assembly power receiving port. Further, the power management unit 1504 may be configured to be electrically coupled with at least one external power supply system using an input connector assembly. Further, the input connector assembly may include at least one first input connector. Further, the at least one first input connector may be configured to be electrically coupled with at least one external power supply port of the at least one external power supply system. Further, the electrically coupling of the power management unit 1504 with the at least one external power supply system may be based on the electrically coupling of the at least one first input connector with the at least one external power supply port. Further, the power management unit 1504 may be configured for receiving an input electrical power from the at least one energy storage device 1502 based on the electrical energy stored in the at least one energy storage device 1502. Further, the input electrical power may be a direct current power. Further, the power management unit 1504 may be configured for supplying an output electrical power to the at least one electrical propulsion assembly based on the receiving of the input electrical power. Further, the supplying of the output electrical power powers the at least one electrical propulsion assembly for propelling the vehicle. Further, the power management unit 1504 may be configured for receiving an external input electrical power from the at least one external power supply system through the at least one external power supply port. Further, the external input electrical power supplied by the at least one external power supply system through the at least one external power supply port may be associated with a voltage. Further, the voltage may be 120 volts. Further, the supplying of the output electrical power may be further based on the receiving of the external input electrical power.

Figure 16:
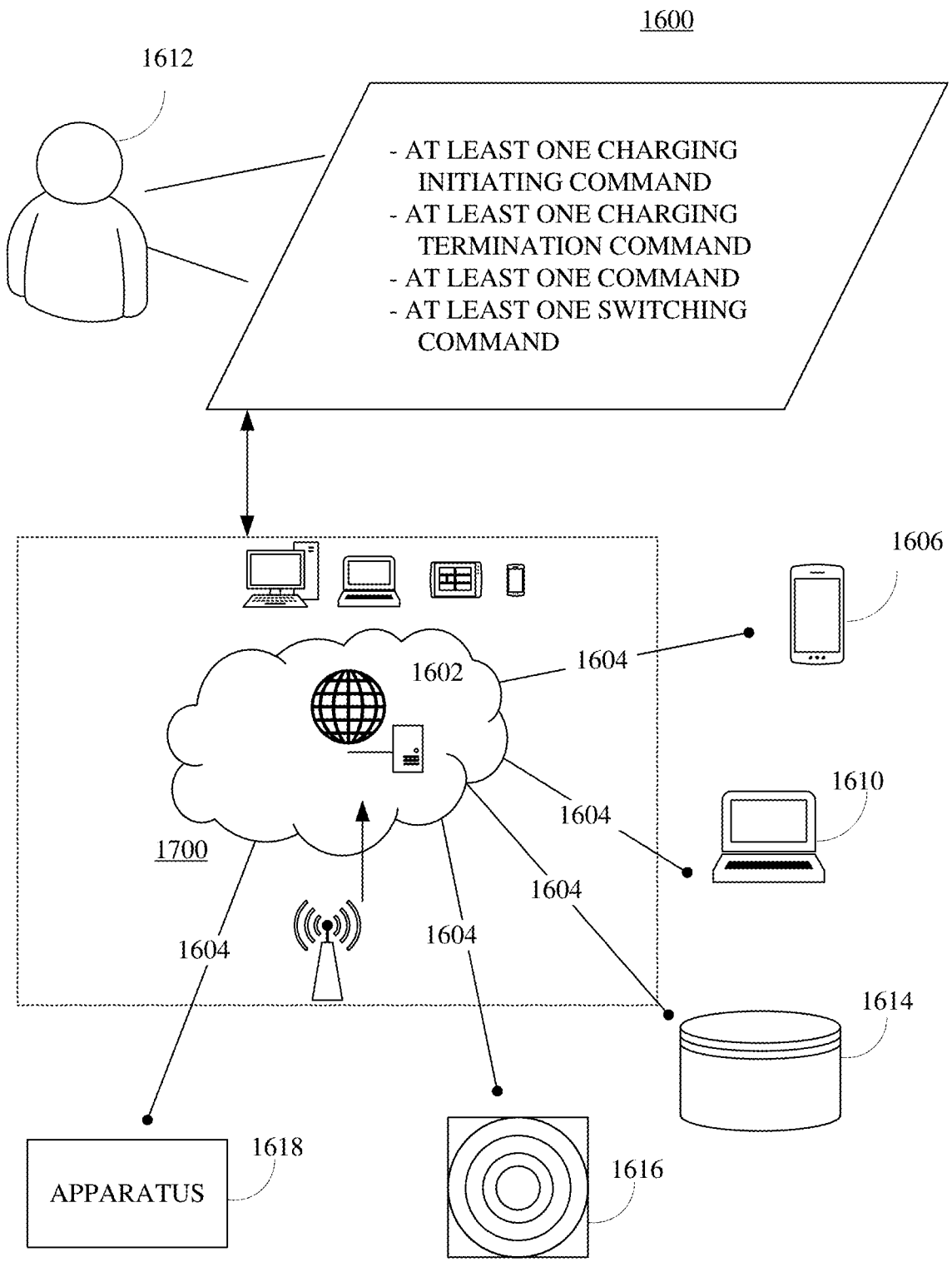
FIG. 16 is an illustration of an online platform consistent with various embodiments of the present disclosure.

FIG. 16 is an illustration of an online platform 1600 consistent with various embodiments of the present disclosure. By way of non-limiting example, the online platform 1600 to facilitate electrically powering a vehicle may be hosted on a centralized server 1602, such as, for example, a cloud computing service. The centralized server 1602 may communicate with other network entities, such as, for example, a mobile device 1606 (such as a smartphone, a laptop, a tablet computer, etc.), other electronic devices 1610 (such as desktop computers, server computers, etc.), databases 1614, sensors 1616, and an apparatus 1618 (such as the apparatus 100, the apparatus 1400, the apparatus 1500, etc.) over a communication network 1604, such as, but not limited to, the Internet. Further, users of the online platform 1600 may include relevant parties such as, but not limited to, end-users, administrators, service providers, service consumers, and so on. Accordingly, in some instances, electronic devices operated by the one or more relevant parties may be in communication with the platform.

A user 1612, such as the one or more relevant parties, may access online platform 1600 through a web based software application or browser. The web based software application may be embodied as, for example, but not be limited to, a website, a web application, a desktop application, and a mobile application compatible with a computing device 1700.

Figure 17:
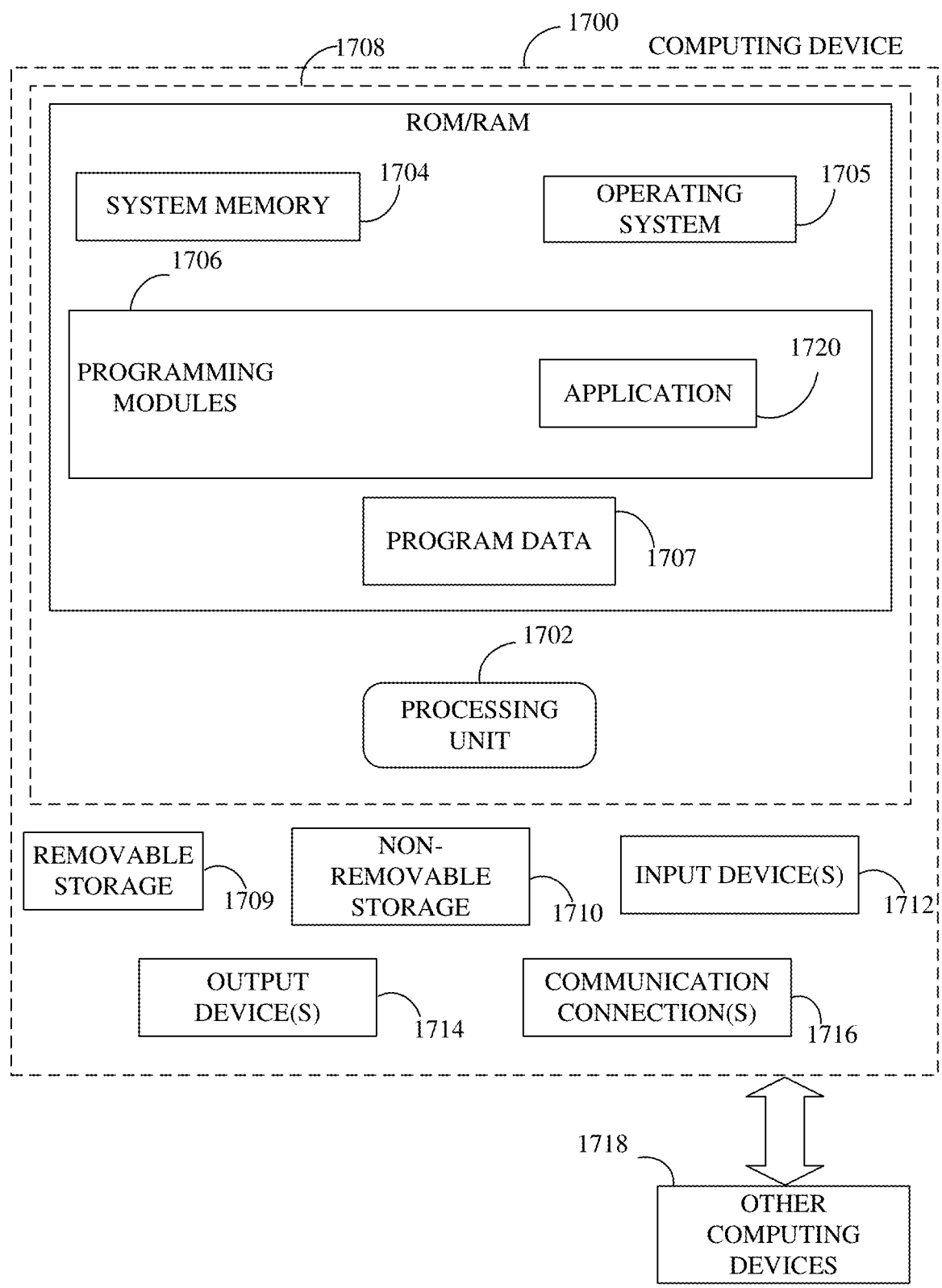
FIG. 17 is a block diagram of a computing device for implementing the methods disclosed herein, in accordance with some embodiments.

With reference to FIG. 17, a system consistent with an embodiment of the disclosure may include a computing device or cloud service, such as computing device 1700. In a basic configuration, computing device 1700 may include at least one processing unit 1702 and a system memory 1704. Depending on the configuration and type of computing device, system memory 1704 may comprise, but is not limited to, volatile (e.g. random-access memory (RAM)), non-volatile (e.g. read-only memory (ROM)), flash memory, or any combination. System memory 1704 may include operating system 1705, one or more programming modules 1706, and may include a program data 1707. Operating system 1705, for example, may be suitable for controlling computing device 1700's operation. In one embodiment, programming modules 1706 may include image-processing modules, machine learning modules, etc. Furthermore, embodiments of the disclosure may be practiced in conjunction with a graphics library, other operating systems, or any other application program and is not limited to any particular application or system. This basic configuration is illustrated in FIG. 17 by those components within a dashed line 1708.

Computing device 1700 may have additional features or functionality. For example, computing device 1700 may also include additional data storage devices (removable and/or non-removable) such as, for example, magnetic disks, optical disks, or tape. Such additional storage is illustrated in FIG. 17 by a removable storage 1709 and a non-removable storage 1710. Computer storage media may include volatile and non-volatile, removable, and non-removable media implemented in any method or technology for storage of information, such as computer-readable instructions, data structures, program modules, or other data. System memory 1704, removable storage 1709, and non-removable storage 1710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD), other optical storage, magnetic cassettes, magnetic tape, magnetic disk storage or other magnetic storage devices, or any other medium which can be used to store information and which can be accessed by computing device 1700. Any such computer storage media may be part of device 1700. Computing device 1700 may also have input device(s) 1712 such as a keyboard, a mouse, a pen, a sound input device, a touch input device, a location sensor, a camera, a biometric sensor, etc. Output device(s) 1714 such as a display, speakers, a printer, etc. may also be included. The aforementioned devices are examples and others may be used.

Computing device 1700 may also contain a communication connection 1716 that may allow device 1700 to communicate with other computing devices 1718, such as over a network in a distributed computing environment, for example, an intranet or the Internet. Communication connection 1716 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1704, including operating system 1705. While executing on processing unit 1702, programming modules 1706 (e.g., application 1720 such as a media player) may perform processes including, for example, one or more stages of methods, algorithms, systems, applications, servers, databases as described above. The aforementioned process is an example, and processing unit 1702 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. An apparatus for electrically powering a vehicle, the apparatus comprising:
at least one energy storage device configured for storing electrical energy; and
a power management unit electrically coupled with the at least one energy storage device, wherein the power management unit is configured to be electrically coupled with at least one electrical propulsion assembly of the vehicle using an output connector assembly, wherein the output connector assembly comprises at least one first output connector, wherein the at least one first output connector is configured to be electrically coupled with at least one propulsion assembly power receiving port of the at least one electrical propulsion assembly, wherein the electrically coupling of the power management unit with the at least one electrical propulsion assembly is based on the electrically coupling of the at least one first output connector with the at least one propulsion assembly power receiving port, wherein the power management unit is configured for:
receiving an input electrical power from the at least one energy storage device based on the electrical energy stored in the at least one energy storage device, wherein the input electrical power is a direct current power; and
supplying an output electrical power to the at least one electrical propulsion assembly based on the receiving of the input electrical power, wherein the supplying of the output electrical power powers the at least one electrical propulsion assembly for propelling the vehicle.

2. The apparatus of claim 1, wherein the power management unit is further configured to be electrically coupled with at least one external power supply system using an input connector assembly, wherein the input connector assembly comprises at least one first input connector, wherein the at least one first input connector is configured to be electrically coupled with at least one external power supply port of the at least one external power supply system, wherein the electrically coupling of the power management unit with the at least one external power supply system is based on the electrically coupling of the at least one first input connector with the at least one external power supply port, wherein the power management unit is further configured for receiving an external input electrical power from the at least one external power supply system through the at least one external power supply port, wherein the supplying of the output electrical power is further based on the receiving of the external input electrical power, wherein the apparatus further comprises at least one power receiving port electrically coupled with the power management unit, wherein the input connector assembly comprises at least one second input connector, wherein the at least one second input connector is electrically coupled with the at least one power receiving port, wherein the electrically coupling of the power management unit with the at least one external power supply system is further based on the electrically coupling of the at least one second input connector with the at least one power receiving port.

3. The apparatus of claim 2, wherein the external input electrical power supplied by the at least one external power supply system through the at least one external power supply port is associated with a voltage and a frequency, wherein the voltage ranges from 110 to 120 volts, wherein the frequency is 60 hertz.

4. The apparatus of claim 2, wherein the external input electrical power is an alternating current power, wherein the power management unit comprises at least one first power conversion unit, wherein the at least one first power conversion unit is configured for converting the external input electrical power from the alternating current power to a direct current power based on the receiving of the external input electrical power, wherein the supplying of the output electrical power is further based on the converting of the external input electrical power from the alternating current power to the direct current power, wherein the output electrical power is a direct current power.

5. The apparatus of claim 4, wherein the external input electrical power is the direct current power with at least one first electrical characteristic based on the converting, wherein the at least one first power conversion unit is further configured for converting the external input electrical power from the direct current power with the at least one first electrical characteristic to a direct current power with at least one second electrical characteristic, wherein the supplying of the output electrical power is further based on the converting of the external input electrical power from the direct current power associated with the at least one first electrical characteristic to the direct current power with the at least one second electrical characteristic, wherein the output electrical power is the direct current power associated with the at least one second electrical characteristic, wherein the power management unit is further configured for supplying an additional electrical output power to the at least one energy storage device for charging the at least one energy storage device based on the converting of the external input electrical power from the alternating current power to the direct current power.

6. The apparatus of claim 1 further comprising a body comprising each of the at least one energy storage device and the power management unit, wherein the body is configured to be removably disposed with the vehicle.

7. The apparatus of claim 1, wherein the input electrical power received from the at least one energy storage device is the direct current power with at least one first electrical characteristic, wherein the power management unit comprises a second power conversion unit, wherein the second power conversion unit is configured for converting the input electrical power from the direct current power associated with the at least one first electrical characteristic to a direct current power associated with at least one second electrical characteristic based on the receiving, wherein the supplying of the output electrical power is further based on the converting of the input electrical power from the direct current power associated with the at least one first electrical characteristic to the direct current power with the at least one second electrical characteristic, wherein the output electrical power is the direct current power with the at least one second electrical characteristic.

8. The apparatus of claim 1 further comprising at least one power supply port electrically coupled with the power management unit, wherein the output connector assembly further comprises at least one second output connector, wherein the at least one second output connector is electrically coupled with the at least one power supply port, wherein the electrically coupling of the output connector assembly with the power management unit is further based on the electrically coupling of the at least one second output connector with the at least one power supply port.

9. The apparatus of claim 1, wherein the power management unit is further configured to be electrically coupled with at least one electrical power receiving device using the output connector assembly, wherein the output connector assembly further comprises at least one auxiliary output connector, wherein the at least one auxiliary output connector is configured to be electrically coupled with at least one device port of the at least one electrical power receiving device, wherein the electrically coupling of the power management unit with the at least one power receiving device is based on the electrically coupling of the at least one auxiliary output connector with the at least one device port, wherein the power management unit is further configurable for supplying an auxiliary output electrical power to the at least one electrical power receiving device based on the receiving of the input electrical power, wherein the supplying of the auxiliary output electrical power powers the at least one power receiving device.

10. The apparatus of claim 1, wherein the power management unit is further configured to be electrically coupled with at least one energy harvesting device, wherein the at least one energy harvesting device is configured for:
  harvesting electrical energy from at least one energy source, wherein the at least one energy source comprises at least one renewable energy source; and
  generating an additional electrical power based on the harvesting, wherein the power management unit is further configured for:
  receiving the additional electrical power from the at least one energy harvesting device based on the generating of the additional electrical power; and
  supplying the additional electrical power to the at least one energy storage device for charging the at least one energy storage device based on the receiving of the additional electrical power from the at least one energy harvesting device.

11. The apparatus of claim 10, wherein the at least one energy harvesting device is disposed with the vehicle, wherein the harvesting of the electrical energy from the at least one energy source is during at least one operation of the vehicle.

12. The apparatus of claim 10, wherein the at least one energy harvesting device is configured to be stationarily placed on at least one surface exterior to the vehicle, wherein the harvesting of the electrical energy is based on the stationarily placing of the at least one energy harvesting device, wherein the vehicle is in a stationary condition while the at least one energy harvesting device is stationarily placed on the at least one surface.

13. The apparatus of claim 1, wherein the at least one electrical propulsion assembly comprises at least one vehicle energy storage device and at least one electric propulsion motor, wherein the at least one electric propulsion motor is electrically coupled with the at least one vehicle energy storage device, wherein the at least one electric propulsion motor is powered by the at least one vehicle energy storage device, wherein the electrically coupling of the power management unit with the at least one electrical propulsion assembly comprises electrically coupling of the power management unit with the at least one vehicle energy storage device, wherein the supplying of the output electrical power to the at least one electrical propulsion assembly comprises supplying the output electrical power to the at least one vehicle energy storage device for charging the at least one vehicle energy storage device based on the electrically coupling of the power management unit with the at least one vehicle energy storage device.

14. The apparatus of claim 13 further comprising:
at least one first sensor configured for detecting a state of charge of the at least one vehicle energy storage device; and
a processing device communicatively coupled with the at least one first sensor, wherein the processing device is configured for:
generating at least one data based on the detecting of the state of charge of the at least one vehicle energy storage device;
analyzing the at least one data based on at least one charging initiation criterion;
determining an initiation of the charging of the at least one vehicle energy storage device based on the analyzing of the at least one data based on the at least one charging initiating criterion; and
generating at least one charging initiating command for the power management unit based on the determining of the initiation of the charging of the at least one vehicle energy storage device, wherein the processing device is operatively coupled with the power management unit, wherein the supplying of the output electrical power to the at least one vehicle energy storage device for the charging of the at least one vehicle energy storage device is initiated based on the at least one charging initiating command.

15. The apparatus of claim 14, wherein the at least one first sensor is further configured for detecting a current state of charge of the at least one vehicle energy storage device after elapsing of at least one time period from the initiating of the supplying of the output electrical power, wherein the processing device is further configured for:
generating at least one current data based on the detecting of the current state of charge;
analyzing the at least one current data based on at least one charging termination criterion;
determining a termination of the charging of the at least one power storage unit based on the analyzing of the at least one data based on the at least one charging termination criterion; and
generating at least one charging termination command for the power management unit based on the determination of the charging, wherein the supplying of the output electrical power to the at least one vehicle energy storage device is terminated based on the at least one charging termination command.

16. The apparatus of claim 1, wherein the at least one electrical propulsion assembly comprises at least one vehicle energy storage device and at least one electric propulsion motor, wherein the at least one electric propulsion motor is electrically coupled with the at least one vehicle energy storage device, wherein the electrically coupling of the power management unit with the at least one electrical propulsion assembly comprises electrically coupling of the power management unit with the at least one electric propulsion motor, wherein the apparatus further comprises:
at least one second sensor configured for detecting at least one parameter associated with the at least one vehicle energy storage device; and
a processing device communicatively coupled with the at least one second sensor, wherein the processing device is configured for:
generating at least one parameter data based on the detecting of the at least one parameter;
analyzing the at least one parameter data;
determining a requirement for the at least one electric propulsion motor based on the analyzing of the at least one parameter data; and
generating at least one command for the power management unit based on the requirement, wherein the processing device is operatively coupled with the power management unit, wherein the supplying of the output electrical power to the at least one electrical propulsion assembly comprises supplying the output electrical power to the at least one electric propulsion motor based on the at least one command.

17. The apparatus of claim 1, wherein the at least one electrical propulsion assembly comprises at least one vehicle energy storage device and at least one electric propulsion motor, wherein the output connector assembly comprises at least one switch, wherein the electrically coupling of the power management unit with the at least one electrical propulsion assembly using the output connector assembly comprises electrically coupling of the power management unit with the at least one vehicle energy storage device and the at least one electric propulsion motor using the at least one switch, wherein the at least one switch is configured to be transitioned between a plurality of states, wherein the supplying of the output electrical power comprises supplying the output electrical power to the at least one electric propulsion motor, wherein the at least one switch allows the supplying of the output electrical power to the at least one electric propulsion motor in a first state of the plurality of states, and restricts electrically powering of the at least one electric propulsion motor from the at least one vehicle energy storage device, wherein the at least one switch restricts the supplying of the output electrical power to the at least one electric propulsion motor in a second state of the plurality of states, and allows the electrically powering of the at least one electric propulsion motor from the at least one vehicle energy storage device.

18. The apparatus of claim 17 further comprising a processing device operatively coupled with the at least one switch, wherein the processing device is configured for generating at least one switching command for the transitioning of the at least one switch based on at least one switching criterion, wherein the transitioning of the at least one switch is further based on the at least one switching command.

19. An apparatus for electrically powering a vehicle, the apparatus comprising:
at least one energy storage device configured for storing electrical energy; and
a power management unit electrically coupled with the at least one energy storage device, wherein the power management unit is configured to be electrically coupled with at least one electrical propulsion assembly of the vehicle using an output connector assembly, wherein the output connector assembly comprises at least one first output connector, wherein the at least one first output connector is configured to be electrically coupled with at least one propulsion assembly power receiving port of the at least one electrical propulsion assembly, wherein the electrically coupling of the power management unit with the at least one electrical propulsion assembly is based on the electrically coupling of the at least one first output connector with the at least one propulsion assembly power receiving port, wherein the power management unit is configured to be electrically coupled with at least one external power supply system using an input connector assembly, wherein the input connector assembly comprises at least one first input connector, wherein the at least one first input connector is configured to be electrically coupled with at least one external power supply port of the at least one external power supply system, wherein the electrically coupling of the power management unit with the at least one external power supply system is based on the electrically coupling of the at least one first input connector with the at least one external power supply port, wherein the power management unit is configured for:

receiving an input electrical power from the at least one energy storage device based on the electrical energy stored in the at least one energy storage device, wherein the input electrical power is a direct current power;

supplying an output electrical power to the at least one electrical propulsion assembly based on the receiving of the input electrical power, wherein the supplying of the output electrical power powers the at least one electrical propulsion assembly for propelling the vehicle; and receiving an external input electrical power from the at least one external power supply system through the at least one external power supply port, wherein the supplying of the output electrical power is further based on the receiving of the external input electrical power.

20. An apparatus for electrically powering a vehicle, the apparatus comprising:

at least one energy storage device configured for storing electrical energy; and a power management unit electrically coupled with the at least one energy storage device, wherein the power management unit is configured to be electrically coupled with at least one electrical propulsion assembly of the vehicle using an output connector assembly, wherein the output connector assembly comprises at least one first output connector, wherein the at least one first output connector is configured to be electrically coupled with at least one propulsion assembly power receiving port of the at least one electrical propulsion assembly, wherein the electrically coupling of the power management unit with the at least one electrical propulsion assembly is based on the electrically coupling of the at least one first output connector with the at least one propulsion assembly power receiving port, wherein the power management unit is configured to be electrically coupled with at least one external power supply system using an input connector assembly, wherein the input connector assembly comprises at least one first input connector, wherein the at least one first input connector is configured to be electrically coupled with at least one external power supply port of the at least one external power supply system, wherein the electrically coupling of the power management unit with the at least one external power supply system is based on the electrically coupling of the at least one first input connector with the at least one external power supply port, wherein the power management unit is configured for:

receiving an input electrical power from the at least one energy storage device based on the electrical energy stored in the at least one energy storage device, wherein the input electrical power is a direct current power;

supplying an output electrical power to the at least one electrical propulsion assembly based on the receiving of the input electrical power, wherein the supplying of the output electrical power powers the at least one electrical propulsion assembly for propelling the vehicle; and receiving an external input electrical power from the at least one external power supply system through the at least one external power supply port, wherein the external input electrical power supplied by the at least one external power supply system through the at least one external power supply port is associated with a voltage, wherein the voltage is 120 volts, wherein the supplying of the output electrical power is further based on the receiving of the external input electrical power.

* * * * *